United States Patent [19]

Prochazka et al.

[11] 3,878,969

[45] Apr. 22, 1975

[54] RECEPTACLE MEANS FOR SOLID PROPELLANT USEFUL TO INFLATE AUTOMOBILE SAFETY DEVICES

[75] Inventors: Arthur Prochazka, Munich; Siegfried Wolf, Taufkirchen, both of Germany

[73] Assignee: Bayern-Chemie Gesellschaft fur Flugchemische Antriebe mit beschrankter Haftung, Aschau, Germany

[22] Filed: Dec. 17, 1973

[21] Appl. No.: 425,233

[30] Foreign Application Priority Data

Dec. 20, 1972   Germany...................... 2262346

[52] U.S. Cl.................. 222/3; 102/39; 280/150 AB
[51] Int. Cl............................................... B67b 7/24
[58] Field of Search..................... 222/3, 5; 220/19; 280/150 AB; 102/39, 40; 9/321-326

[56] References Cited
UNITED STATES PATENTS

| | | |
|---|---|---|
| 2,299,466 | 10/1942 | Coffman............................... 102/39 |
| 2,530,633 | 11/1950 | Scholz................................ 222/3 X |
| 2,912,133 | 11/1959 | Adrian................................. 220/19 |
| 3,282,460 | 11/1966 | Boznango............................ 220/19 |

*Primary Examiner*—Robert B. Reeves
*Assistant Examiner*—Hadd S. Lane
*Attorney, Agent, or Firm*—Toren, McGeady and Stanger

[57] ABSTRACT

Receptacle means are provided for bodies of solid propellant which are ignited to inflate safety cushions for automotive vehicles. The solid propellant bodies are maintained within a gas permeable structure which is preferably formed from wire mesh material and which prevents premature ignition of the solid propellant while allowing gas produced when the propellant is ignited by the occurrence of a predetermined condition to cause inflation of the safety cushions.

4 Claims, 5 Drawing Figures

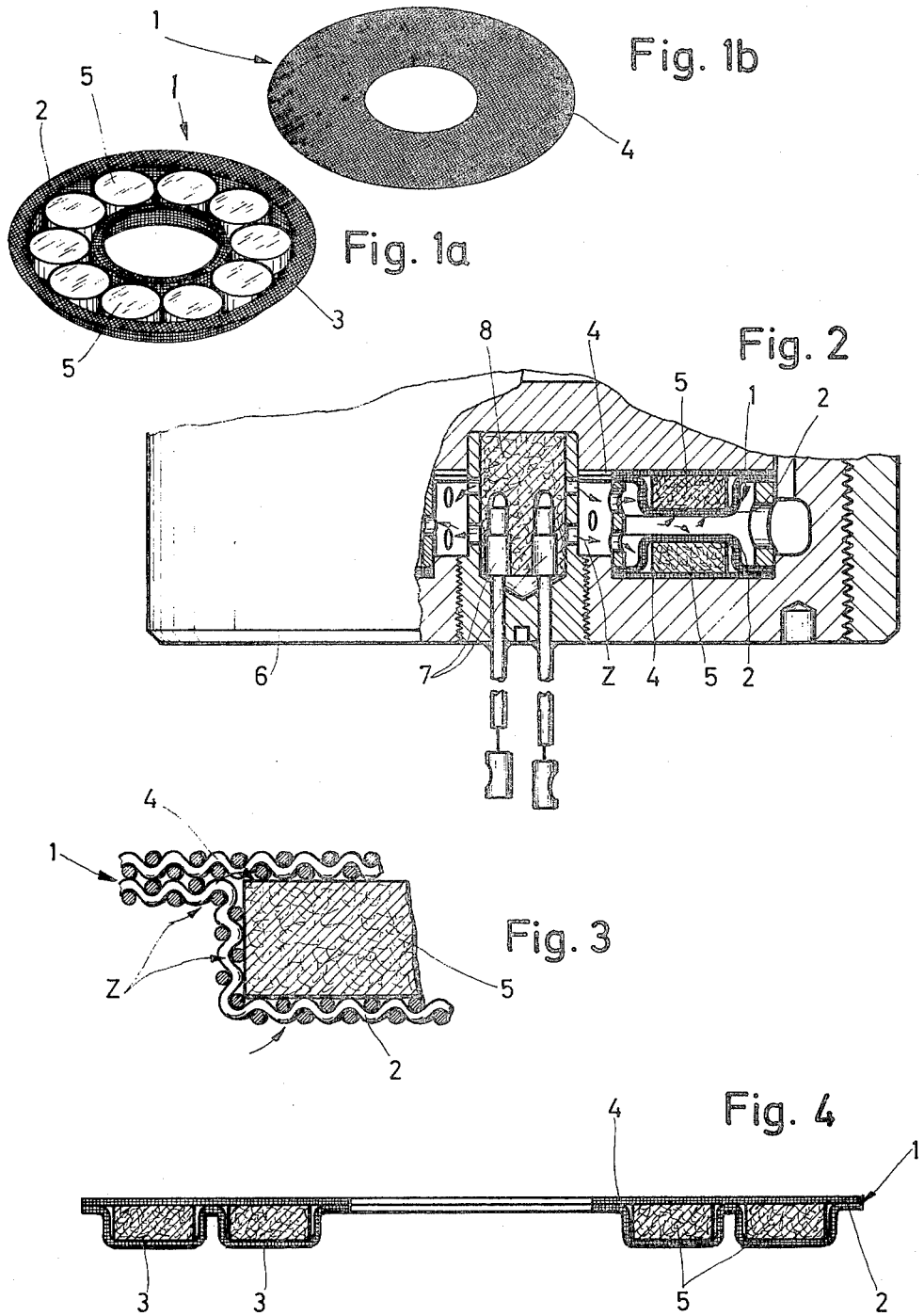

3,878,969

RECEPTACLE MEANS FOR SOLID PROPELLANT USEFUL TO INFLATE AUTOMOBILE SAFETY DEVICES

BACKGROUND OF THE INVENTION

The present invention relates generally to a device for storing a solid combustible material, and more particularly to receptacle means which prevent the premature ignition of the combustible material while enabling gas produced thereby to flow out of the receptacle means within which the solid material is stored. The invention is particularly applicable in the storage of solid propellant useful in motor vehicles to inflat safety cushions.

Inflatable systems for the protection of passengers in automotive vehicles have been proposed which include cushions which are inflated upon the occurrence of an emergency condition to protect the vehicle passengers. Such cushions are usually maintained in a folded condition at or near the general vicinity of the steering wheel hub or of the glove compartment. Usually, sensing means are provided which sense sudden deceleration of the vehicle and cause automatic inflation of the cushions in the event of an accident. When inflated, the cushions occupy the space directly in front of the chest and head of the vehicle passengers, thereby protectively maintaining the passenger against the seat and head rest of the vehicle and preventing injurious forward motion.

The filling of the safety cushions is effected either by a compressed air system including compressed air cylinders or by gas which is produced from the combustion of chemical propellants, with the gas being cooled to tolerable temperatures before being permitted to enter the safety cushion.

The use of chemical propellants involves certain advantages since it enables the reduction and release of the pressure gas for inflating the safety cushion within a relatively short period of time with large amounts of gas being fed directly into the cushion. Hence, rapid filling of the safety cushion occurs, in most cases within milliseconds, thereby enhancing the effectiveness of the safety cushion system. In the case where compressed air systems involving air cylinders are used, it becomes necessary to store the cylinders at a point located a distance from the safety cushions and this produces the disadvantage that a delay may occur in the filling of the safety cushions with the compressed air. Thus, in an emergency, a system of less effectiveness may result.

Although chemical substances for the production of pressure gas involve advantages, they are not, on the other hand, without attendant problems. Since solid chemical propellants having a high impact and abrasion resistance produce, as a rule, gases having a high CO content and other components which represent a severe health hazard, their use may be prohibitive unless appropriate measures are taken to avoid such problems. Some of the disadvantages of chemical propellants arise by virtue of the use of additives or plastic binders which produce toxic gases. Coating the solid propellants which are pressed from a powder substance with a wear resistant material has not provided a practical solution to the problems because these coatings also consist of materials which produce toxic gases during combustion. Solid propellants which are pressed from pure propellant powder and which produce non-toxic gases are, however, sensitive to impact and abrasion. Despite this drawback, it has been found necessary to use solid substances which consist merely of pressed propellant powder without harmful additives and binders.

In view of this, it is the object of the present invention to provide means whereby such pure solid propellants pressed from powdered material may be safely utilized. The invention provides a support mechanism secured against damage such as breakage and abrasion during the operation of the vehicle, thereby ensuring, in addition to a practically constant performance characteristic, complete ignition and combustion of the solid propellants from all sides thereof.

SUMMARY OF THE INVENTION

Briefly, the present invention may be described as comprising one or several receptacle means which are gas permeable on all sides and which are configured to fit the position of the solid propellant.

In one embodiment of the invention, the receptacle means consists of two parts; namely, a container member provided with an annular depression for supporting and at least partially enclosing therein in a fixed position the solid propellant and a lid member for closing said container member.

In a further aspect of the invention, the receptacle means are formed of wire mesh material. When a double-row or multiple-row arrangement of tablet-shaped solid propellant bodies is to be utilized, the container member may be so configured in accordance with the invention as to include several concentrically arranged annular depressions.

The invention ensures that the individual solid propellants may be ignited simultaneously on all sides by an ignition flame and that the subsequent combustion may occur in an undisturbed manner so that a performance yield is achieved which is practically uniform through the combustion period and which is only influenced by the combustion geometry of the individual propellant tablets. Linear contact between the individual propellant tablets is maintained at a negligible level. Due to the fixed position of the tablets, any damage to the individual solid propellant before the occurrence of an emergency condition inducing combustion is avoided. The fixed position of the combustible tablets is obtained in a simple manner by the utilization of wire mesh material which retains the individual solid propellants with great frictional contact. The arrangement according to the invention is, furthermore, simple and inexpensive to manufacture and provides a relatively lightweight structure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWING

In the drawing:

FIG. 1a is a perspective view of a container member of the receptacle means of the present invention having propellant tablets stored therein;

FIG. 1b is a perspective view of the lid member of the invention;

FIG. 2 is a sectional view partially broken away showing the receptacle means of the invention installed in a gas generator;

FIG. 3 is a sectional view showing a partial detail of the apparatus of FIG. 2; and FIG. 4 is a sectional view showing a further embodiment of the receptacle means of the invention.

DETAILED DESCRIPTION OF THE PREFERRED EMBODIMENTS

In FIGS. 1a and 1b of the drawing, there is depicted receptacle means 1 in accordance with the present invention comprising a container member 2 having an annular depression 3 and a lid member 4 formed of a planar configuration. Both the container member 2 and the lid member 4 are formed from wire mesh material. A plurality of individual propellant tablets 5 are located within the annular depression 3 of the container member 2 and when the lid member 4 is placed in position over the annular depression 3, it forms a closure for the container member, as depicted in FIG. 2.

FIG. 2 depicts a gas generator 6 with two solid propellant receptacles 1 located in a series configuration with the receptacles 1 being aligned relative to each other in an axial direction. Centrally located electric primer pellets 7 operate to ignite a primer charge 8. The igniting flames Z thus produced will operate to ignite the solid propellant 5 by exposure of the propellant to the flame.

Thus it will be seen that by virtue of the construction and design of the receptacle 1, the ignition of the propellant tablets 5 on all sides thereof will be effected when the gas generator 6 is ignited by the igniting flames, as particularly depicted in FIG. 3. At the same time, there is also ensured that the same pressure will act on all sides of the solid propellant 5 so that the propellant tablets will not be unfavorably stressed in this respect.

FIG. 4 shows a further embodiment of the present invention wherein a receptacle 1 with a container member 2 and a pair of concentrically arranged annular depressions 3 is provided. Propellant tablets 5 may be placed within each of the annular depressions 3 thereby enabling storage of the solid propellant tablets in an arrangement which involves a pair of concentrically arranged groups of propellant tablets.

In each of the embodiments of the invention depicted herein, when the solid propellant tablets 5 are ignited, the gas produced thereby will be able to flow through the receptacle means 1 for proper application to an inflatable device which may comprise the safety cushions of an automotive vehicle. It will be clear that by utilization of the present invention the solid propellant may be firmly stored in a position which will prevent undesired premature combustion thereof but which will also enable proper combustion upon the occurrence of a predetermined condition without impairing the ability of the gas produced by combustion to flow in a desired manner.

While specific embodiments of the invention have been shown and described in detail to illustrate the application of the inventive principles, it will be understood that the invention may be embodied otherwise without departing from such principles.

What is claimed is:

1. Apparatus for storing in a fixed supported position a plurality of bodies of solid propellant material particularly useful for inflating inflatable safety devices in automotive vehicles, said propellant material bodies being supported in a manner to avoid premature ignition thereof while permitting gas produced by ignition caused by a predetermined condition to be transmitted to said inflatable devices to effect inflation thereof, said apparatus comprising receptacle means structured to be gas permeable on all sides thereof and adapted to have said solid propellant bodies firmly and individually retained therein, and a central cut-out portion formed in said receptacle means and extending therethrough for receiving an igniting device that ignites said solid propellant bodies said bodies being spaced around said central portion.

2. Apparatus according to claim 1 wherein said receptacle means is essentially constructed of two parts, one of said parts comprising a container member having an annular depression formed therein for supporting and at least partially enclosing in a fixed position said solid propellant bodies with the other of said parts comprising a lid member configured to enclose said propellant bodies within said container member, both of said parts having a central cut-out forming said central cut-out portion of said receptacle means.

3. Apparatus according to claim 1 wherein said receptacle means is essentially composed of wire mesh material.

4. Apparatus according to claim 2 wherein said container member of said receptacle means is configured to define at least two concentrially arranged annular depressions enabling retention therein of plural rows of solid propellant bodies.

* * * * *